United States Patent [19]

Mollman et al.

[11] Patent Number: 4,504,431
[45] Date of Patent: * Mar. 12, 1985

[54] ELECTRICALLY CONDUCTIVE FIBER GLASS ARTICLES AND SHEETS

[75] Inventors: Robert E. Mollman, Moreland Hills, Ohio; Ralph Silva, Springboro, Pa.

[73] Assignee: Molded Fiber Glass Companies, Ashtabula, Ohio

[*] Notice: The portion of the term of this patent subsequent to Mar. 20, 2001 has been disclaimed.

[21] Appl. No.: 547,965

[22] Filed: Nov. 2, 1983

Related U.S. Application Data

[63] Continuation-in-part of Ser. No. 421,530, Sep. 22, 1982, Pat. No. 4,438,059.

[51] Int. Cl.³ .............................................. B29G 1/00
[52] U.S. Cl. .................................... 264/105; 252/507; 264/257; 524/910
[58] Field of Search ................ 264/105, 257; 524/910; 252/507

[56] References Cited

U.S. PATENT DOCUMENTS 2,683,669  7/1954  Coler .................................. 252/511

FOREIGN PATENT DOCUMENTS 267855  10/1963  Australia ............................. 264/105
1437314  5/1976  United Kingdom ................ 524/910

Primary Examiner—James Derrington
Attorney, Agent, or Firm—Charles L. Lovercheck; Wayne L. Lovercheck; Dale R. Lovercheck

[57] ABSTRACT

This application discloses a process of making electrically conductive fiber glass articles whereby carbon black is mixed with the resin to provide the desired value of electrical conductivity. A large amount of titanium dioxide is added to counteract the black color resulting from the carbon black addition. The resulting paste is added to fiber glass and the resin is cured thus resulting in a light gray or other gray tones. It is important that the carbon black, titanium and resin be thoroughly mixed to disperse the carbon and other pigments, and the mixing may be accomplished by means of a high intensity mixer or ball mill.

9 Claims, No Drawings

ELECTRICALLY CONDUCTIVE FIBER GLASS ARTICLES AND SHEETS

REFERENCE TO PRIOR APPLICATION

This application is a continuation in part of application, Ser. No. 421,530, filed Sept. 22, 1982 now U.S. Pat. No. 4,438,059 issued Mar. 20, 1984.

GENERAL DESCRIPTION OF THE INVENTION

The addition of a conductive material such as metal and/or carbon to plastic for static elimination is not new. For controlling conductivity, carbon and graphite materials in powder ad fiber form are the most common methods of providing conductivity in a resin sheet. By careful selection of the type and amount of carbon, a wide range of conductivity can be provided. The most popular conductivity range for static charge elimination in electronic assembly work is one $\times 10^5$ to $10^8$ OHMs.

Materials in the form of blocks and sheets are available in many materials such as vinyl, rubber, ABS, and fiber glass polyester in this range. One common characteristic of all these products is that they are all dark black. For proper lighting and assembly efficiency, black is the least desirable color.

Applicant has been able to produce conductive sheets and containers in the desired conductivity range in light gray and other gray tones. Applicant has been able to accomplish this by using large amounts of the following:

Unless otherwise specified the values used are based on resin weight and not on total laminate weight or volume. In addition to the resin, the laminate would normally contain 25–30% fiber glass reinforcement as well as extenders such as calcium carbonate or clay in amounts from zero to 40%.

| COLOR | PERCENT OF RESIN | INORGANIC PIGMENT |
|---|---|---|
| Titanium Dioxide | 25% | |
| Puce | 12.5% | 4179 Brown Iron Oxide |
| | 12.5% | TI O2 |
| Green | 36.4% | Chromium Oxide Green |
| Brown | 25% | 4179 Brown Iron Oxide |
| Blue | 40% | Ultra Marine Blue |
| | 80% | TI O2 |
| Blue | 50% | Ultra Marine Blue |
| | 50% | TI O2 |
| Blue | 62.5% | Ultra Marine Blue |
| | 25% | TI O2 |
| Brown | 46.9% | Brown Iron Oxide |
| Gray | 54.54% | TI O2 |
| Tan | 30% | Synthetic Titinate |
| Dark Gray | 50% | Antimony Oxide |
| Maroon | 35% | Cadmium Suffide/ Cadmium Selenium |

By careful selection of the type of carbon in the range of 1% to 2% and using carefully controlled compounding procedures, Applicant can successfully produce these products in the required conductivity range.

With other plastic materials, the amount of additives that can be added is very limited so that when the desired carbon content is reached the black pigment effect cannot be overcome. Applicant's process can be carried out with a laminate material in addition to sheet products. This material has particular potential use in trays, boxes and the like. The process according to the invention is carried out with resin systems that have a low enough viscosity and a high enough filler acceptance to accept high percentages of other pigments to overcome the black color caused by carbon. 20% inorganic pigment has been found to be a satisfactory percentage in a number of instances in which Applicant has used the process.

The pigments mentioned above are equally acceptable. Applicant has currently developed shades of brown and green using high percentages of these pigments rather than titanium dioxide as a main pigment to overcome the blackness of the carbon black.

Special procedures are required to incorporate the conductive carbon and other pigments into the resin systems to insure conductivity as well as color uniformity. Applicant has been able to produce products using two distinct manufacturing methods. (1) Prepare a high viscosity resin paste which is applied to the fiber glass reinforcement at the press. The fiber glass reinforcement can be in the form of mat for sheet and relatively flat shapes or preform for deep draw parts could be used. (2) Resin paste portions are combined with the reinforcement either in bulk or sheet form and molded directly from this conductive molding compound.

The process has generally been carried out using unsaturated polyester and other thermoset plastic resins which are liquid at room temperature. Applicant has been able to incorporate the conductive carbons in 1% to 2% levels and also incorporate pigments such as inorganic pigment to partly overcome the pigmentation effect of the carbon black. A laminate using 1%–2% carbon plus 15%–30% inorganic pigment will produce parts of a light gray color. Additional pigments can be used to replace all or part of the inorganic pigment and provide a limited range of color from brown or various tints of gray. The percentage of inorganic pigment will ben determined by the color of the final product desired. For example, to provide a light brown color requires only a small percentage of inorganic pigment. Other matallic pigments than titanium dioxide may be used, for example iron oxide and chromium oxide may be used.

One important factor that has a major effect on conductivity as well as appearance is to completely disperse the carbon and other pigments in the resin mix.

One method of achieving a good dispersion is to mix in these pigments into a portion of the resin using a high intensity mixer or roller mill. Only after these pigments, including the conductive carbon, is fully dispersed should the remaining ingredients be added. Conductivity must be carefully checked and carbon levels adjusted as required. It has been found that there is a considerable difference in conductivity even in the same grade of conductive carbon between batches.

The embodiments of the invention in which an exclusive property or privilege is claimed are defined as follows:

1. A method of making an electrically conductive laminate comprising,
   providing a thermoset resin,
   adding sufficient carbon black to the material to give the material the desired electrical conductivity,
   adding a pigmentation material to said carbon black and polymer to partly overcome the pigmentation effect of the carbon black,
   mixing said carbon black and pigmentation material to completely disperse the carbon and pigment in the resin, said pigmentation being added in an amount of 15 percent to 120 percent by weight of said resin, said pigmentation being selected from the group consisting of titanium dioxide, chromium oxide green, brown iron oxide, antimony oxide and ultra marine blue material, and adding a catalyst to the material to form a paste, adding the paste to fiber glass and curing the resin.

2. The method recited in claim 1 wherein said resin is an unsaturated polyester polymer.

3. The method recited in claim 2 wherein said carbon black is added in the amount of between 1% and 2% by weight.

4. The method recited in claim 1 wherein a high intensity mixer is used to disperse said carbon black and said pigmentation throughout said polymer.

5. The method recited in claim 1 wherein said paste is added to said fiber glass in a molding press, and said material is pressed before curing.

6. The method recited in claim 4 wherein said paste is formed into sheets and said sheets are placed on said fiber glass and then molded.

7. The method recited in claim 1 wherein said pigment, carbon black and resin are applied to said fiber glass in bulk form and then molded.

8. The method recited in claim 1 wherein said colored thermoset product is of a color selected from the group consisting of gray, brown, blue and green.

9. The method recited in claim 1 wherein said pigmentation material comprises an oxide.

* * * * *